Patented Sept. 27, 1932

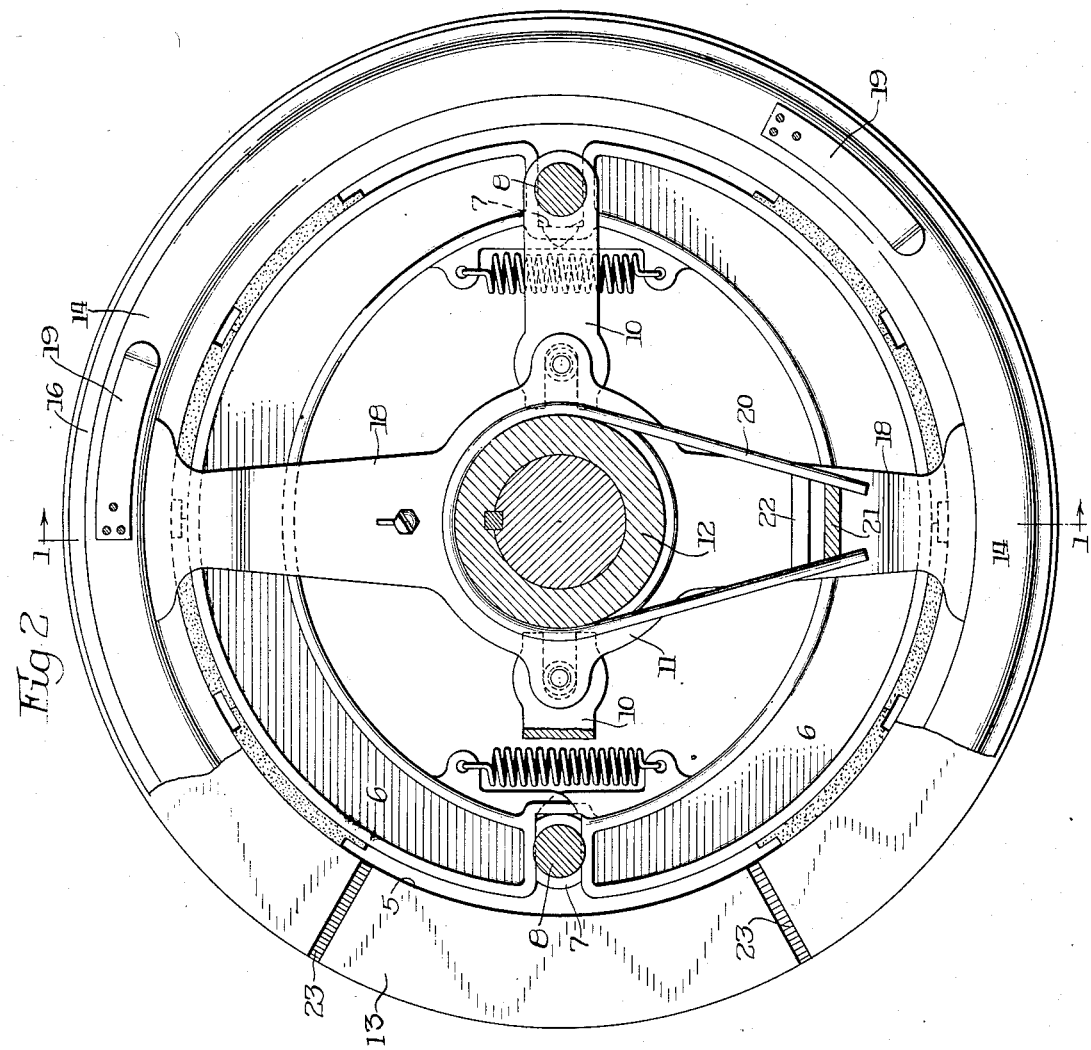

1,880,061

UNITED STATES PATENT OFFICE

ARTHUR P. WARNER, OF BELOIT, WISCONSIN, ASSIGNOR TO WARNER ELECTRIC BRAKE CORPORATION, OF SOUTH BELOIT, ILLINOIS, A CORPORATION OF ILLINOIS

ELECTROMAGNETIC FRICTION DEVICE

Original application filed March 5, 1928, Serial No. 259,050. Divided and this application filed February 17, 1930. Serial No. 428,903.

This invention relates to electromagnetic friction devices and more particularly to devices for use in electric brakes and the like having two annular magnetic elements adapted for axial gripping engagement. The application is a division of my copending application Serial No. 259,050, filed March 5, 1928.

Magnets of the above character are capable of producing attractive forces of large magnitudes for a comparatively small energizing current provided there is no substantial air gap between the coacting armature and pole faces. Particles of metal or other material wearing off from the elements or coming onto their coacting surfaces from extraneous sources hold the surfaces separated and materially impair the efficiency of the magnet. In electric brakes where one magnetic element rotates and the other is relatively non-rotatable, the presence of such particles between the elements produces a severe scoring or roughening of the surfaces with a resultant decrease in the magnet's strength and also an excessive and uneven wearing at the coacting surfaces. These objectionable characteristics are particularly aggravated in friction devices wherein the coacting elements are maintained in mechanical contact continuously, in which case the extraneous particles are held between the surfaces and continue their scoring action for longer time intervals.

The primary object of the present invention is to overcome the difficulties above mentioned by providing an electromagnetic friction device having annular coacting elements and a novel means which operates automatically to remove extraneous particles from between the elements and therby maintain their faces clean and smooth.

Another object is to provide, in a friction device having annular friction elements arranged for relative rotation, a grooved surface on one of the elements for receiving particles of extraneous material accumulating between the elements and means for maintaining the elements in light mechanical contact while they are deenergized so as to render the grooves of said surface continuously operative to produce a cleaning action.

Other objects and advantages of the invention will become apparent from the following detailed description taken in connection with the accompanying drawing, in which:

Figure 1 is a vertical sectional view of an electric brake having a friction operator constructed in accordance with the present invention, the section being taken along the line 1—1 of Fig. 2.

Fig. 2 is an elevational view of the brake shown in Fig. 1 with the anchor plate of the brake removed and part of one magnet element broken away to show the face of the other element.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawing the invention is embodied in an electrically controlled operator of the so-called momentum type which is arranged to actuate a brake for retarding the motion of a vehicle wheel 4. The exemplary brake comprises a drum 5 carried by the wheel and an expansible braking means within the drum. The braking means is composed of two shoes 6 between whose adjacent ends are cams 7 mounted for oscillation on anchor pins 8 which are rigid with a non-rotatable plate 9 closing the open end of the drum. Rigid with each cam 7 is a radially disposed crank arm 10 whose inner end is engageable with the short arm of a bell crank lever 11 mounted on a hub 12 of the plate 9 for limited oscillation about the drum axis to actuate the cams 7 and thereby expand the braking means.

The operator for the brake comprises a pair of rings 13 and 14 of magnetic material having opposed flat faces of relatively narrow radial width. The ring 13 constitutes a magnetic armature and preferably is rotatable with the drum. In the present instance it is disposed externally of the drum and is in the form of a thin flange integral with the drum near the inner edge of the latter.

The ring 14 constitutes the magnet proper and is of U-shaped cross-section carrying an annular winding 15 between two concentric poles 16 whose faces are disposed in a common plane and coact with the inwardly facing surface of the armature ring thereby forming a substantially closed flux circuit around the winding 15. The magnet poles are separated by plates 17 of non-magnetic and wear-resisting material whose surfaces are flush with the pole faces. The magnet is rigid with two long radial arms 18 of the bell crank 11.

A plurality of leaf springs 19 on the plate 9 bear against the magnet ring and urge the ring and bell crank continuously toward the face of the armature 13 while the winding 15 is deenergized. This yieldable floating mounting of the magnet allows for the inherent lateral wobbling of the armature ring during rotation of the vehicle wheel and maintains the friction faces of the rings in intimate mechanical contact, thereby tending to eliminate any air gap which such lateral wobbling would otherwise produce. A spring 20 of the hairpin type, acting between a stop 21 on the plate 9 and a lug 22 on one of the arms 18, normally overcomes the tendency of the magnet ring to move by reason of its constant contact with the armature. Thus the magnet is maintained in a normal brake-released position (Fig. 2) so long as the winding 15 is deenergized.

Upon the application of energizing current to the winding 15 when the wheel is rotating, the two rings 13 and 14 are drawn into powerful gripping engagement, the magnet ring being carried along frictionally with the armature with the result that the bell crank 11 actuates the cranks 10 which expands the brake shoes against the drum. After the normal clearance between the shoes and the drum has been taken up, slippage occurs between the rings and the brake remains set until the winding 15 is deenergized. When the latter occurs, the magnet is returned to released position by the spring 20 and the pressure on the brake shoes is thereby relieved.

In order to prevent particles of metal or other extraneous material from being retained on the friction faces on the magnetic rings, thereby causing a detrimental air gap to exist between them, means is provided which acts automatically in the rotation of the vehicle wheel to quickly remove any particles that may accumulate between the rings. This means comprises one or more transverse depressions or grooves 23 cut, stamped or otherwise suitably formed in the friction face of one or both of the magnetic rings so that the particles will, due to the relative motion between the engaging surfaces, be brought opposite one of the grooves and become deposited therein. While the width and depth of the grooves need only be sufficient to receive the largest particles which are apt to accumulate, it is preferred to make them substantially wider and deeper so as to allow the particles to move through the grooves freely by a centrifugal action thereby avoiding clogging of the grooves.

The centrifugal force for excluding the particles from the grooves is induced by rotation of the vehicle wheel. For this reason the grooves are preferably formed in the face of the armature ring and extend uninterruptedly across the entire face of the ring. The centrifugal action is most effective when the grooves are disposed substantially radially, which position is also preferred because the decrease of the magnet strength by exposure of the pole faces to the grooves is minimized. For the same reason it is preferred to form the grooves in the armature only and to reduce their number as far as possible. However, it has been found that scoring of the friction faces is more effectually prevented when more than one groove is employed. In the present instance there are six grooves spaced equidistant around the armature ring.

With the grooves arranged as above described, it will be apparent that any particles of extraneous material coming between the magnetic elements during the light engagement due to the springs 19 or to the powerful engagement caused by energization of the winding 15, will be presented quickly to one of the grooves 23 and immediately thrown out by centrifugal action. Scoring and excessive wearing of the friction surfaces is thereby effectually prevented. It will be observed that any particles existing between the rings when the magnet is energized will produce a greater scoring action than when the magnet is deenergized. Thus, it is desirable that all of the particles be removed from the friction faces at the time when the winding is energized so as to avoid entrapment of the particles when they are under a powerful gripping pressure. This result is accomplished in the present instance by coordination of the springs 19 and the grooves 23. Thus the springs hold the magnetic elements in light mechanical contact continuously while the winding is deenergized and cause immediate removal of all particles produced in any brake-setting operation or accumulating after such operation. The springs 19 thereby perform the additional function of rendering the surface cleaning grooves 23 effective at all times, thereby causing removal of the particles by the grooves at a time when the coacting surfaces are under lightest pressure and less susceptible to scoring by extraneous particles.

I claim as my invention:

1. In an electromagnetic friction device, the combination of a normally rotatable magnetic ring having a substantially flat friction surface disposed in a plane perpendicular to its rotational axis, a relatively non-rotatable magnetic ring having a friction surface opposing and coacting with said first mentioned surface, and a magnetic winding carried by one of said rings and adapted when energized to cause gripping engagement of said surfaces, said rotatable ring having a plurality of grooves formed in its friction surface at annularly spaced points and extending transversely of and entirely across said surface so as to receive particles of material accumulating between said surfaces and to throw such particles off from the rotating ring by centrifugal action.

2. In an electromagnetic friction device, the combination of a rotatable ring composed of magnetic material and having a flat radially disposed friction face, a second ring having a cooperating face, a winding carried by one of said rings adapted when energized to bring said faces into gripping engagement, and a groove formed in and extending transversely of the face of said rotatable ring for collecting particles of extraneous material and thereby removing said particles from the faces of said rings, said groove having an outwardly opening end from which extraneous particles deposited in said groove will be excluded by centrifugal action.

3. In an electromagnetic friction device, the combination of a rotatable ring composed of magnetic material and having a substantially flat and radially disposed friction face, a second ring of magnetic material having a flat face engageable with said first mentioned face, a magnetic winding on one of said rings adapted when energized to cause gripping engagement between said faces, means for removing particles of extraneous material from said faces comprising a depression in one of said faces for collecting such particles in the relative rotation between the rings, and means acting constantly to maintain the faces of said rings in light mechanical contact and thereby render said particle removing means operative while said winding remains deenergized.

In testimony whereof, I have hereunto affixed my signature.

ARTHUR P. WARNER.